United States Patent
Kyler

(10) Patent No.: US 7,024,403 B2
(45) Date of Patent: Apr. 4, 2006

(54) FILTER DRIVER FOR IDENTIFYING DISK FILES BY ANALYSIS OF CONTENT

(75) Inventor: Daniel B. Kyler, Colorado Springs, CO (US)

(73) Assignee: VERITAS Operating Corporation, Mountain View, CA (US)

( * ) Notice: Subject to any disclaimer, the term of this patent is extended or adjusted under 35 U.S.C. 154(b) by 651 days.

(21) Appl. No.: 10/133,370

(22) Filed: Apr. 29, 2002

(65) Prior Publication Data

US 2002/0174102 A1 Nov. 21, 2002

Related U.S. Application Data

(60) Provisional application No. 60/287,350, filed on Apr. 27, 2001.

(51) Int. Cl.
*G06F 17/30* (2006.01)
(52) U.S. Cl. .................. 707/3; 707/104.1; 709/224
(58) Field of Classification Search ............ 707/104, 707/100, 101, 103, 10, 104.1; 709/224, 200
See application file for complete search history.

(56) References Cited

U.S. PATENT DOCUMENTS

| | | | |
|---|---|---|---|
| 5,757,915 A | 5/1998 | Aucsmith et al. | |
| 5,805,719 A | 9/1998 | Pare, Jr. et al. | |
| 5,864,870 A * | 1/1999 | Guck | 707/104.1 |
| 5,983,270 A * | 11/1999 | Abraham et al. | 709/224 |
| 6,449,615 B1 * | 9/2002 | Liu et al. | 707/10 |

* cited by examiner

*Primary Examiner*—Charles Rones
*Assistant Examiner*—Jacob F. Betit
(74) *Attorney, Agent, or Firm*—Meyertons Hood Kivlin Kowert & Goetzel, P.C.; B. Noël Kivlin

(57) ABSTRACT

A system and method for excluding certain types of files from being saved to a system by examining file data. The file data is examined by: mapping the circular queue to memory; reading the file identifiers from the circular queue (a named mutex is locked until all file identifiers have been read from the queue); using the file identifier to open the file; scanning the opened file to create a file signature; comparing the file signature to each entry on a list of signature criteria; and performing a storage policy if there is a match.

8 Claims, 3 Drawing Sheets

FILTER DRIVER FOR IDENTIFYING DISK FILES BY ANALYSIS OF CONTENT

This application claims priority from U.S. Provisional Application Ser. No. 60/287,350 filed Apr. 27, 2001. The entirety of that provisional application is incorporated herein by reference.

NOTICE OF COPYRIGHTED MATERIAL IN DISCLOSURE

A portion of the disclosure of this patent document may contain material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present invention generally relates to systems and methods for keeping operating systems free of unwanted files and, more particularly, identifying and removing unwanted files from network servers.

2. Related Art

The prior FileScreen™ product comprises reading a file name of a file and comparing the file name to a list of unauthorized file names to see if the file should be allowed to be saved to a system.

BACKGROUND OF THE TECHNOLOGY

Despite dramatic reductions in the cost of disk space it remains necessary for those managing servers in a network environment to allocate space to multiple users and enforce policies which limit the kinds of files which are stored in the allocated space.

For example, system administrators often want to prevent users from saving certain files. This can be due to system administrators wishing to save valuable storage space for legitimate files, as opposed to personal files. The prior art has found ways to prevent users from saving certain files. Virus scanners, name mask scanners, and file size scanners have been used. Virus scanners search for viruses, and block a file from being saved if a virus is contained within the file. Name mask scanners review the name mask (e.g., .mp3, .exe, .doc) to see if it is a prohibited name mask and if so, block the file from being saved. File size scanners search for the file name, and if it is a prohibited file, block the file from being saved. These methods usually use an Input/Output (I/O) Filter Driver to detect files that are attempted to be written (saved) to the server. The I/O Filter Driver gathers data and makes the results available to a user or other computer process.

For example, an employer has determined that music files are usually used for personal reasons, and thus does not want employees to be able to save music files on the employer's system. The system administrator could thus program the system so that it would not allow music files (.mp3 files) to be saved. When a user attempts to create a file that has the extension .mp3, then that file creation will fail.

The prior art solutions, however, can be circumvented by the user. For example, the user could save a file with the extension .mp4 in order to circumvent the system administrator's precautions. The offending music file is thus still able to be saved to the system.

There is thus a need to better prevent files, which are commonly and openly exchanged or transmitted over a network, from being saved to a server.

SUMMARY OF THE INVENTION

It is therefore an object of the present invention to exclude certain types of files from being saved to a system by analyzing the file content.

Another object of the invention is to provide network administrators with the ability to implement policies for excluding files based on content signatures.

It is also an object of the invention to provide an identification of disk files which can be matched to the file exclusion policies of network administrators.

A further object of the invention is to identify disk files with a user mode program which recognizes a file signature by scanning file content.

Another object of the invention is to coordinate user mode and kernel mode operations efficiently, and to manage the use of paged pool and synchronization primitives without crashing the system.

The present invention provides a system and method for limiting files that can be saved to a system. Instead of looking only at the file name, the present invention can review the data of the file to be saved to see if it matches the data found in an unwanted file type.

The present invention can comprise: intercepting file write operations of an operating system and capturing an identifier for each intercepted file; matching the file identifier against a list of criteria defined by a user; performing a storage policy if there is a match; if there is not a match, setting a named event, writing the file identifier to a circular queue, completing the interrupted file write operation, and examining the file data to see if it matches the data found in an unwanted file type.

The file data can be examined by: mapping the circular queue to memory; reading the file identifiers from the circular queue (a named mutex is locked until all file identifiers have been read from the queue); using the file identifier to open the file; scanning the opened file to create a file signature; comparing the file signature to each entry on a list of signature criteria; and performing a storage policy if there is a match.

The present invention can comprise the following objects: User Applications, an I/O Filter Driver, a Policy Database, a Paging File Section, a Signature Processing user mode service, and a Signature Database.

Additional objects, advantages and novel features of the invention will be set forth in the following description and will become apparent to those skilled in the art of reading this description or practicing the invention. The objects and advantages of the invention may be realized and attained by the appended claims.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE INVENTION

Figure 1:
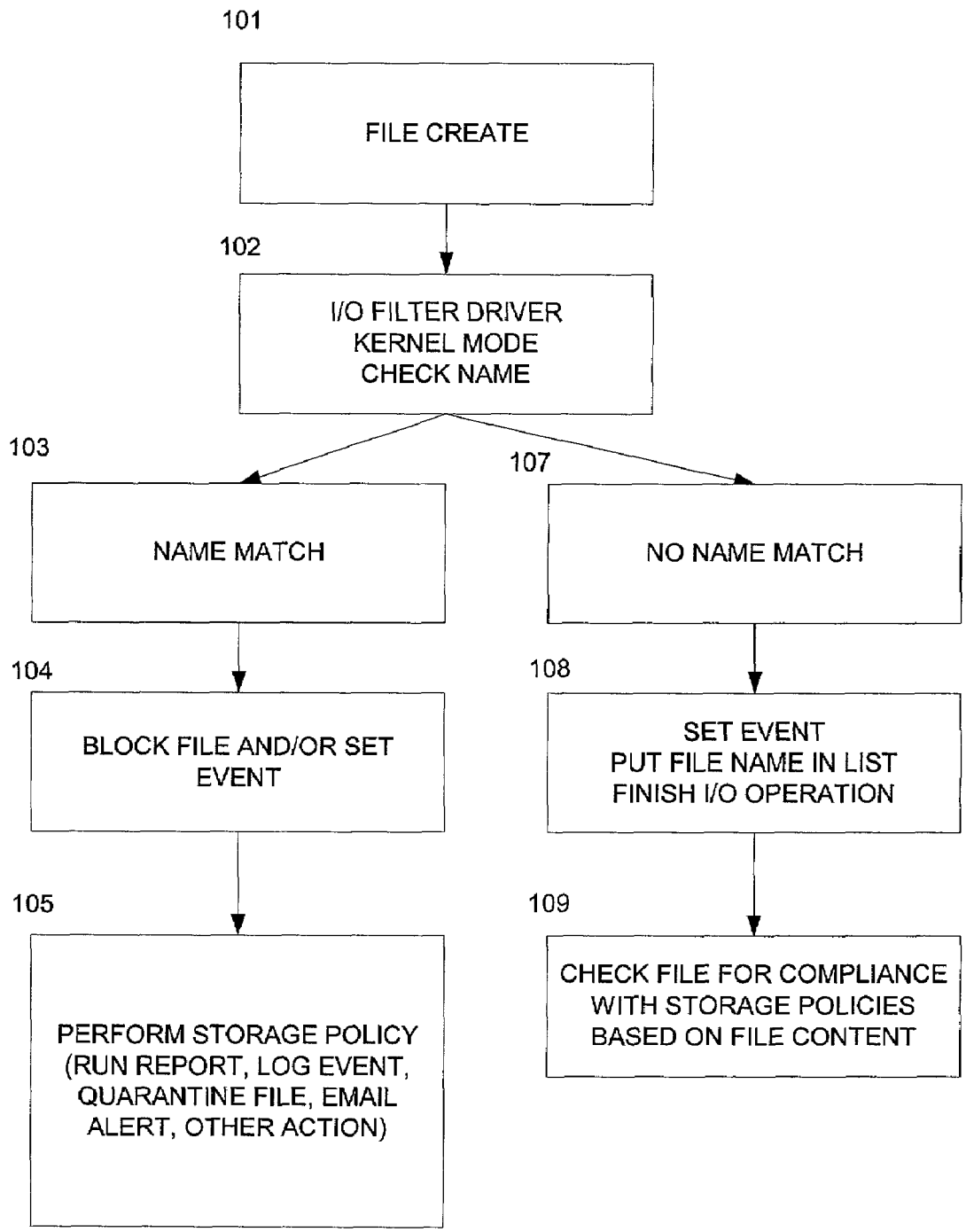
FIG. 1 illustrates file signature checking as part of a general file screening product in a preferred embodiment of the present invention.

FIG. 1 illustrates how the present invention fits within a general file screening product, referred to in one embodiment as FileScreen™.

It should be noted that an object of the present invention is to coordinate user mode and kernel mode operations efficiently. User mode is the operational state where a program accepts input from a user. Kernel mode is the operational state where a program accepts input from the kernel, or core, of the operating system.

In step 101, a file creation operation of an operating system is initialized. In step 102, the file creation operation is intercepted by an I/O filter driver, which operates in kernel mode. In step 103, it is determined if the name of the file matches specified criteria. If so, in step 104, the writing of the file will be blocked and/or a storage policy will be executed in step 105. The storage policy includes actions as file quarantine, run report, log event, email alert, or other action. If there is no name match in step 103, the process moves to step 107. In step 108, a named event will be set, the name of the file will be placed on a queue for signature processing, and the file write operation will be finished. In step 109, the file is checked for compliance with storage policies based on file content. This step will be described in further detail with reference to FIG. 3.

Figure 2:
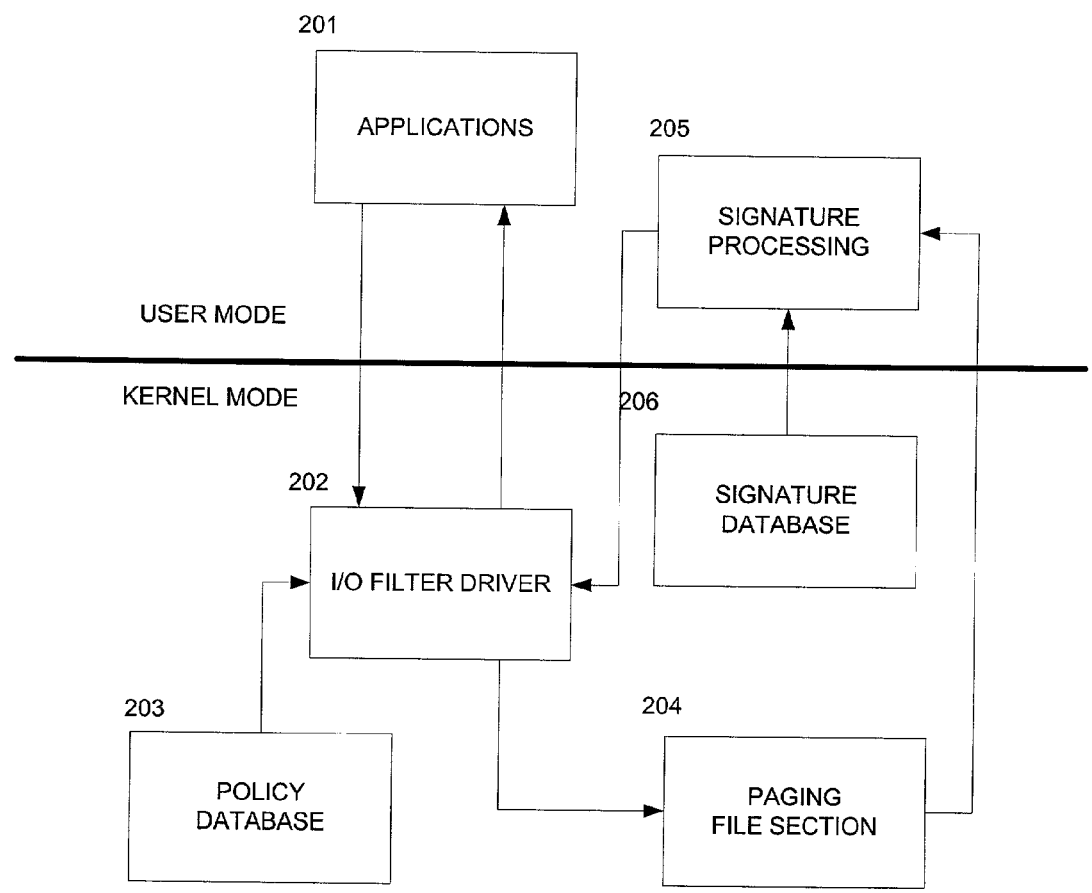
FIG. 2 illustrates an overview of the main objects of the invention in a preferred embodiment of the present invention.

Turning now to FIG. 2, the main components of the present invention are illustrated for a preferred embodiment of the present invention. FIG. 2 comprises User Applications 201, an I/O Filter Driver 202, a Policy Database 203, a Paging File Section 204, Signature Processing 205, and a Signature Database 206.

User Applications. User Applications 201 are programs designed to assist in the performance of a specific task.

I/O Filter Driver. The I/O Filter Driver 202 detects files being written to the server, and intercepts this operation and gives the file to the Signature Processing 205. The I/O Filter Driver 202 also checks the file name mask to see if it is a prohibited file name mask.

Policy Database. The Policy Database 203 is a file composed of rules that are applied to files to determine the storage policy that should be applied to the files.

Paging File Section. A Paging File Section 204 is a circular queue (a multi-element data structure or list). The Signature Processing 205 operates on files taken from the Paging File Section 204 and checks them against the Signature Database 206.

Signature Processing. The Signature Processing 205 is a user mode service that checks the data in a file to determine if it is a prohibited type of file. The Signature Processing 205 checks files against the Signature Database 206, and attempts to match the file with prohibited file signatures.

Signature Database. The Signature Database 206 is a database of file signatures. The file signature is a common pattern of information found in the first 1024 bytes that all files of the same type share. In addition, the file signature is a sequence of data used for identification. For example, an .mp3 file will have certain information at the beginning of the file that identifies it to other computer components as an .mp3 file.

Figure 3:
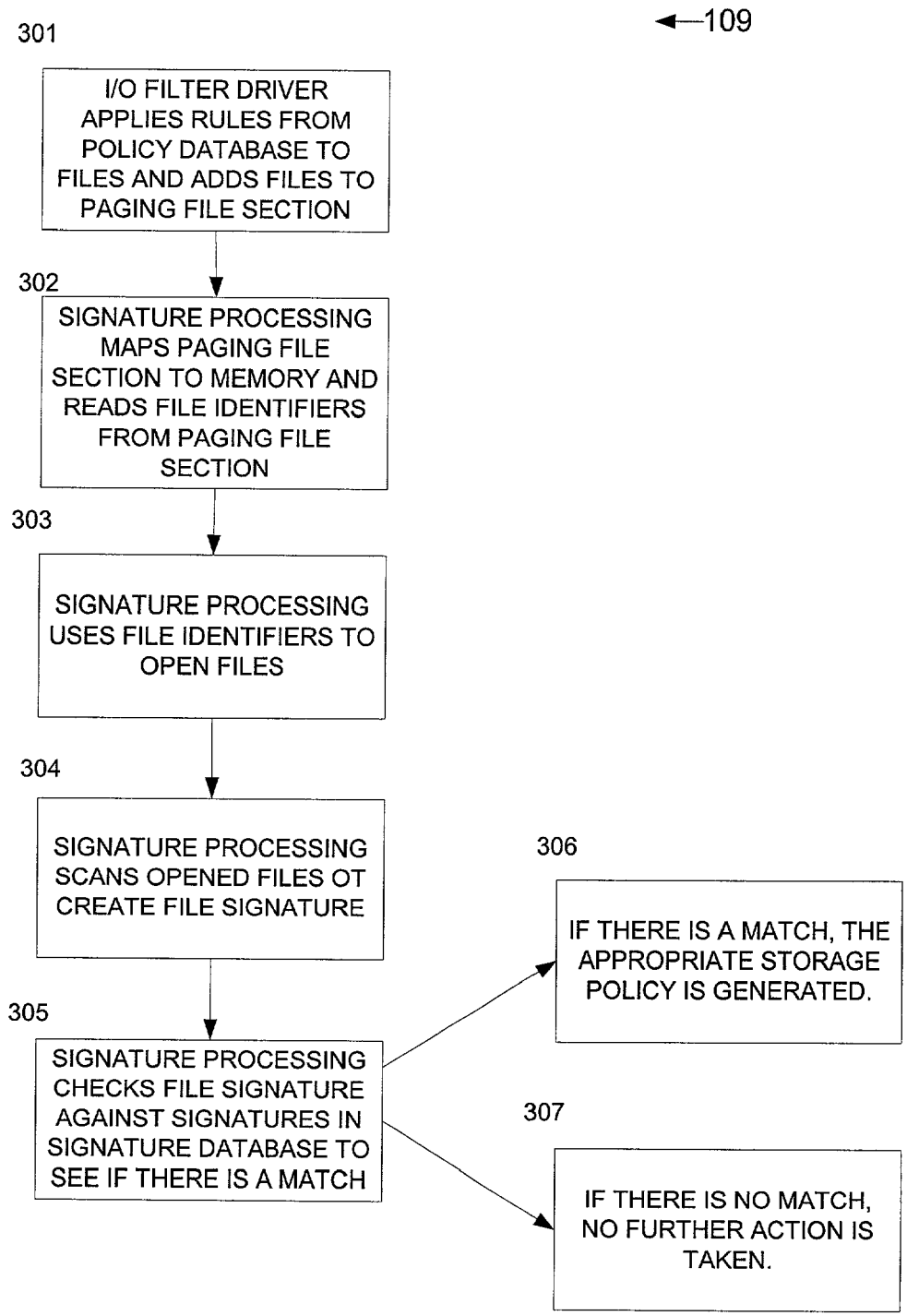
FIG. 3 illustrates how files are checked for compliance with storage policies based on file content, in a preferred embodiment of the present invention, as set forth in step 109 of FIG. 1.

FIG. 3 illustrates how files are checked for compliance with storage policies based on file content, in a preferred embodiment of the present invention, as set forth in step 109 of FIG. 1.

In step 301, the I/O Filter Driver 202 applies rules from the Policy Database 203 to files that are the subject of the file requests, and communicates the need to analyze the signature of a file by adding the file to a circular queue implemented as the Paging File Section 204. In step 302, the Signature Processing 205 maps the Paging File Section 204 to memory and reads the file identifiers from the Paging File Section 204. (The named mutex is locked until all file identifiers have been read from the Paging File Section 204.) In step 303, the Signature Processing 205 uses the file identifier to open the file. In step 304, the Signature Processing 205 scans the opened file to create a file signature. In step 305, the Signature Processing 205 checks the file's signature against the signatures in the Signature Database 206. (Note that the Policy Database 203 is accessed from kernel mode and the Signature Database 206 is accessed from user mode.) In step 306, if there is a match between the file's signature and a signature in the Signature Database 206, the appropriate storage policy (e.g., quarantine or delete file request) is generated by the Signature Processing 205 and intercepted by the I/O Filter Driver 202. In step 307, if there is no match, no further action is taken.

Filename Purposes

Filenames are needed for several purposes: comparison for creation rejection based on name; comparison for scanning eligibility; comparison for removal of queue entries from a scan wait list; and passing to the user mode service so that it can open the file. Each of these operations has different requirements on the form of filename used, and is affected differently by the complications of long and short names, hard links (alternate names for a file which may be in another directory), and mount points (partitions, which may or may not have a drive letter of their own, mounted beneath a directory on another partition). Furthermore, creating an effective strategy for dealing with the possible proliferation of names may place certain requirements on the system administrator (e.g. avoidance of multiple mount points for the same partition).

Comparison Based on Name. The prior art used the name specified by the user to determine whether creation should be failed. This works well for mount points because the I/O Filter Driver 202 sees the first open attempt, which will merely cause a reparse, and can fail it at that point. A reparse is an indication from the file system to the I/O Filter Driver 202 that the file is actually on a different partition, and the I/O Filter Driver 202 should reparse the file name using the new partition. It is unaffected by hard links, because there can be no links to a file which does not exist yet. It is vulnerable to long/short name spoofing, which is when a file is specified in the registry with only its long name, and the user avoids detection of a proscribed file by creating it with the short name of the directory.

This problem is resolved by rebuilding the list of names at the time that rules are read from a registry. For example, if an object in the registry is specified as C:\Program Files\QuotaAdvisor, then FileScreen's data structures for the rule would include the names C:\Program Files\QuotaAdvisor, C:\PROGRA-1\QuotaAdvisor, C:\Program Files\QUOTAA~1 and C:\PROGRA~1\QUOTAA~1.

Since the list is built at initialization time, there will be little performance impact at file creation time.

Comparison for Scanning Eligibility. File names are also used for comparison to determine whether the file should be scanned for content. Storing files with all their names avoids the problem of long/short directory name spoofing for this comparison as well. Hard links are considered a non-issue in this case as well because most scans will be on newly created files which have only the newly created link, and, as with the previous case, the name that the file is opened with is the one which will be used to compare for scan eligibility.

Mount points, however create a special problem for this comparison. In this case it is necessary to build data structures containing the name after the file has been opened. From the I/O Filter Driver 202 point of view there is no association between a first create routine, which is completed with a status reparse routine, and a second create routine, which uses the reparsed name. For example, if a device is mounted at C:\Mount\Users, and the user opens C:\Mount\Users\Smith\Test.dat, once the file is opened the I/O Filter Driver 202 knows only that the file \Smith\Test.dat has been opened on a device. If that device has no drive letter, then it becomes impossible to build a name which can be compared to a file specification from the registry.

Comparison for Removal of Queue Entries. The I/O Filter Driver 202 uses name comparisons to remove entries from the queue of files waiting to be scanned by the signature processing. If a file on the scan wait list is modified, the driver places an entry describing the modified file on a queue waiting to be placed in the I/O Filter Driver 202 shared section. (The I/O Filter Driver 202 controlled queue is different from the circular Paging File Section 204. Data moves to the I/O Filter Driver 202 controlled queue first, and periodically from there to the Paging File Section 204.) If a file is deleted, it is removed from the queue. If it is renamed, the new name is placed in the queue entry. A check is made to avoid duplicate entries in the queue.

Passing to User Mode Service. Because of the proliferation of possible file names, the most reliable way to achieve these goals is not to use a file name for this comparison. Instead, the file ID is used. On the Windows NT™ File System (NTFS), file IDs are immutable. On file allocation tables (FATs), they are not. However, it is rare for file IDs to change, particularly in the short amount of time that a file is on the queue. Furthermore, the consequence of such happening is merely that the Signature Processing 205 unnecessarily attempts an open.

The I/O Filter Driver 202 provides the Signature Processing 205 with a name, any name, with which the service can open the target file for scanning. The name provided is the stored name for the file, queried by a create completion routine, combined with the simplest possible specification for the I/O filter drive (e.g., the drive letter if one exists). This is sufficient to allow the Signature Processing 205 to open the file by whatever means desired.

IRQL, Pool Usage, Synchronization, and Completion Routines

Interrupt Request (IRQL). The I/O Filter Driver 202 used in the prior art operated entirely at passive level. The I/O Filter Driver 202 of the present invention, on the other hand, performs a small number of operations in I/O completion routines, which may execute in an arbitrary thread context at dispatch level. Therefore, care must be taken to properly manage the use of paged pool and synchronization primitives to avoid crashes.

Pool Usage. A substantial amount of work is done by a create completion routine. It is undesirable to do this much work at dispatch level because it would require the exclusive use of non-paged pool for data structures, and spinlock would have to be held for much longer than is advisable. (A spinlocks is a synchronization primitive which, unlike others, can be used at dispatch level). Therefore, the present invention uses a method where an I/O completion status value simply sets an event and returns a more processing required routine. This allows the dispatch routine to wait for the file system to complete the create routine, and then perform its post-processing at passive level before returning control to either the user or higher level filter drivers. Rename and set file information routines, being infrequent and rarely asynchronous operations, use the same method.

With respect to write routines, it is not acceptable to serialize write operations because it would negatively impact system performance. Therefore the most expeditious method for dealing with write routines is to do it in the I/O completion routine, which may be executed at dispatch level. This means that a file tracking structure (a data structure used to track a particular open of a particular file) must be in a non-paged pool, so that it may be written to in the completion routine. The write routine locates the file tracking structure and passes it to the completion routine as the context pointer. If the write routine is successful, the completion routine will set a bit indicating a write has occurred. Since this bit will never be unset (and therefore subsequent writes may be ignored) no synchronization is necessary, and the use of a spinlock can be avoided.

Synchronization. The driver communicates the need to scan a file to the Signature Processing 205 through a circular list implemented as a Paging File Section 204. To avoid having to map this section into every process, a system thread is created which maps the section. This thread removes expired elements from the driver's internal queue and places them in the Paging File Section 204.

The size of the Paging File Section 204 is fixed, but configurable. A registry value is read at startup to set the size of the section. Because the Paging File Section 204 is a fixed size and circular, data must be read from the section without delay. If it is allowed to become stale, it will be overwritten and lost.

The first part of the Paging File Section 204 is a header which contains the starting and ending offsets of the valid data in the section. A named mutex and a named event are used to synchronize access to the Paging File Section 204. The I/O Filter Driver 202 locks the mutex, writes to the section, unlocks the mutex, and sets the event. The Signature Processing 205 waits on the event, locks the mutex, reads until there is no more data, and unlocks the mutex.

Completion Routines. To avoid unnecessary system impact, the least amount of I/O possible is done. In the preferred embodiment, implemented on an NT™ operating system, given the operation of the cache manager on NT™, the file is opened on the signature processing, which passes the handle to each scanner data definition language (DLL) to do its own reads. Multiple reads of the same data go through the fast I/O path and are satisfied from a cache.

When a file appears in the I/O Filter Driver 202 shared section, it is ready for processing by the signature processing, which removes it without delay, as it will eventually be overwritten. The Signature Processing 205 has a thread dedicated to removing file information from the shared Paging File Section 204 and placing it on an internal queue maintained within the Signature Processing 205.

Additional Features

The present invention as described above comprises the following additional features.

Modified I/O Filter Driver. In order to synchronize communication of file scanning needs with the Signature Processing 205, the I/O Filter Driver 202 is modified by adding: a registry value for enabling scanning under an object key (an entry in the 203 describing a particular "object" (a directory)); a definition of a shared Paging File Section 204 name; a definition of a mutex name; and a definition of an event name.

Supporting Data Structures. Supporting data structures are provided by: modifying a device extension routine to: contain a list of device names (e.g., drive letter, mount point paths); contain a list of file control block (FCB) tracking structures; create an FCB tracking structure; create a file object tracking structure; modify an object list entry to contain a list of object names (including both short and long names); modify the object list entry to contain "scanable" bits (which indicate whether files written should be scanned); and create a timer queue entry structure.

Initialization of the Signature Processing. Initialization of the Signature Processing 205 requires: creating a system thread; propagating a "scanable" bit from the registry to the object list entry; and retrieving all long and short name combinations for the file name. The create dispatch is modified by setting a pseudo-completion routine, and creating completion logic as follows: if the status is reparse, evaluate the target name and add the mount point to the target device if required (not implemented); if the status is create, an FCB tracking structure is created if needed, and the name, file ID, and user's ID are queried and stored.

Modified Cleanup and Close Dispatch Routines. The cleanup and close dispatch routines are modified by: removing the file tracking structure from the FCB tracking structure list and deleting the file tracking structure; decrementing the FCB tracking structure reference count and deleting the FCB tracking structure if the reference count is zero; if these structures indicate that the file was modified, a structure is created describing the file in a timer queue; and if no timer is set, one is set with the event for the system thread.

Modified Write Dispatch Routine. A write dispatch routine is implemented by locating tracking structures and executing the following logic: if the file tracking structure modified bit is set, the I/O is ignored, otherwise the completion routine is set, with the file tracking structure serving as context. The write completion routine is modified so that if the write is successful, a modified bit is set in the file tracking structure. If the file system's fast I/O entry point is successfully executed, the corresponding file tracking structure is found and the modified bit is set.

Set Information Dispatch Routine. The present invention establishes the logic for a set information dispatch routine. To set the information dispatch: if the information dispatch code is a file disposition information routine, and the Delete boolean does not equal the current state of the FCB tracking structure delete bit, then a pseudo-completion routine is set. ("Delete" is a single Boolean value, true or false. Files are marked for deletion by this operation and can be later un-marked. Files are actually deleted when they are closed, if they remain marked for deletion.) If the information dispatch code is a file rename information routine, the pseudo-completion routine is set. To complete the set information dispatch routine, if the modification of the disposition was successful, the FCB tracking structure is set to delete the bit to the same state as the current disposition; if the current state is "delete", if finds and deletes any pending timer queue entries for the file. To set the information rename completion routine, if the renaming was successful, there is a search for the timer queue entry for the file and the name is replaced.

Support Routines. In the support routines, the evaluate create routine is set to use all long/short name combinations from the object list entry. A system thread is initialized by: creating a named mutex; creating a named event; creating a Paging File Section 204 basing size on a registry entry; and initialize the Paging File Section 204. Operation of the system thread is provided as follows: wait for timer event; remove expired entries from timer queue; set timer for new entry at head of queue; place entries in shared section and set event; and go to event wait.

While the invention has been described in terms of a single preferred embodiment, those skilled in the art will recognize that the invention can be practiced with modification within the spirit and scope of the appended claims.

What is claimed is:

1. A method to limit files that can be saved to a system, comprising:

intercepting an operation to save a file to the system;

comparing a signature of the file to a list of signature criteria, executing a storage policy if there is a match; and if there is no match, saving the file to the system;

wherein comparing the signature of the file to the list of signature criteria includes:

performing a content scan of the file; wherein said performing includes:

setting a named event;

writing a file identifier of the file to a circular queue; and completing the intercepted operation to save the file to the system, the circular queue being read to memory by a system thread; and processing the file using a signature processing user mode service, wherein said processing includes:

using the file identifier to open the file;

scanning the file to create the file signature; and comparing the file signature to each entry on the list of signature criteria.

2. The method of claim 1, wherein the writing of the file identifier to the circular queue and the reading of the circular queue is synchronized by the named event and a named mutex, the signature processing user mode service waiting on the named event and locking the named mutex for reading from the queue until the queue is empty.

3. The method of claim 1, wherein the writing of the file identifier to the circular queue is done in an input/output completion routine that sets a bit indicating a write has occurred.

4. The method of claim 1, wherein the storage policy is any policy a user has set that controls which files should be saved to the system, and which files should not be saved to the system.

5. The method of claim 1, wherein the storage policy comprises at least one of the group consisting of: deleting the file; quarantining the file; notifying a system administrator; and notifying a user that the file is not allowed to be saved.

6. The method of claim 1, wherein network administrators have an ability to implement the storage policy based on file signatures.

7. A system to limit files that can be saved to a system, comprising:
- an input/output filter driver;
- a signature processing user mode service;
- a signature database;
- a policy database; and
- a circular queue for holding a list of file identifiers;
- wherein the input/output filter driver intercepts an attempt to save a file to the system;
- wherein the signature processing user mode service compares a signature of the file to a list of signature criteria from the signature database, executing a storage policy from the policy database if there is a match, and if there is no match, saving the file to the system;
- wherein comparing the signature of the file to the list of signature criteria includes:
  - performing a content scan of the file, wherein said performing includes:
    - writing a file identifier of the file to the circular queue;
    - setting a named event; and
    - completing the intercepted attempt to save the file to the system, the circular queue being mapped to memory by a system thread; and
  - processing the file using the signature processing user mode service, wherein said processing includes:
    - using the file identifier to open the file;
    - scanning the file to create a file signature; and
    - comparing the file signature to each entry on the list of signature criteria.

8. The system of claim 7, further comprising:
- user applications for generating write file commands intercepted by the input/output filter driver.

* * * * *